United States Patent
Stults et al.

[11] 3,879,089
[45] Apr. 22, 1975

[54] BICYCLE WHEEL ORNAMENT

[76] Inventors: Allan C. Stults, 424 Prospect St., Newport Beach, Calif. 92660; Raymond H. Powell, 11871 Simon Ranch Rd., Santa Ana, Calif. 92705; Edward D. O'Brian, 910 Iroquois Ave., Anaheim, Calif. 92801

[22] Filed: Apr. 22, 1974

[21] Appl. No.: 462,641

[52] U.S. Cl. .......... 301/37 SA; 301/37 R; 40/129 B
[51] Int. Cl. .......................................... B60r 13/00
[58] Field of Search............ 301/37 R, 37 SA, 37 S; 40/129 B; 350/99

[56] References Cited
UNITED STATES PATENTS

| | | | |
|---|---|---|---|
| 3,082,041 | 3/1963 | Hamilton | 301/37 SA |
| 3,310,357 | 3/1967 | Hogan | 301/37 SA |
| 3,684,347 | 8/1972 | Challe et al. | 301/37 SA |

*Primary Examiner*—Richard A. Schacher
*Assistant Examiner*—Victor N. Sakran
*Attorney, Agent, or Firm*—Edward D. O'Brian

[57] ABSTRACT

An ornamental body which is primarily intended to be used between spokes of a bicycle wheel so as to be secured in place by the spokes, can be constructed utilizing a plurality of cam means on opposed surfaces of a flat body of self-supporting material. The cam means are located so that the body may be inserted between the spokes where the spokes cross and thereafter twisted so as to be located in place. As the body is twisted, the cam means exert forces which distend the spokes and then at least partially release these forces so that the cam means serve to retain the body in an operative location. The body may be formed of a fluorescent material and/or may be coated with a phosphor composition. Preferably the body is a circular disc having a centrally located opening which serves to facilitate insertion of the disc in an operative location.

8 Claims, 6 Drawing Figures

BICYCLE WHEEL ORNAMENT

BACKGROUND OF THE INVENTION

The invention set forth in this specification relates to ornamental bodies which are primarily intended to be utilized on bicycle wheels. These bodies are, however, capable of being utilized for ornamental or similar type purposes and for play purposes.

It is commonly recognized that the vast majority of bicycles used in the United States are owned and operated by children within roughly the age group from about 7 to about 15. Such individuals frequently desire to modify their bicycles in any of a different variety of ways so as to improve or change their appearance and/or their play value. Frequently such modifications are only intended to make a particular bicycle have a "neat" type of appearance which will attract attention.

Several different structures have been designed for use with the spokes on a bicycle wheel in order to improve the appearance of the bicycle. One such structure involves a blade-like body of material having a slot along one of its edges which is adapted to receive a spoke on a bicycle. Other structures for this purpose have been cylinders provided with internal means which engage a bicycle spoke and elongated structures which are adapted to be clamped at each of their ends to different spokes of a bicycle wheel. The lack of extremely wide-spread use of any of these structures is considered to evidence the fact that they are not completely satisfactory and/or desirable for their intended purpose.

It is believed that there are many reasons for this. Probably an important reason relates to the ease with which a structure as described may be mounted upon a bicycle wheel. It is also believed that prior structures as are indicated in the preceding are not completely desirable because they may tend to either move on a bicycle spoke as a bicycle is ridden and/or they may come off such a spoke as a bicycle is ridden so as to vibrate the wheel. There may be other or different reasons as to why specific prior structures as are indicated are not satisfactory in decorating bicycle wheels.

BRIEF SUMMARY OF THE INVENTION

A broad objective of this invention is to provide ornamental bodies which are primarily intended to be located on a bicycle wheel where the spokes of such a wheel cross over one another, but which are capable of a variety of utilitarian and play uses. A further objective of the invention is to provide ornamental bodies as indicated which overcome many disadvantages and limitations of prior structures for ornamenting a bicycle wheel. Other objectives of this invention are to provide simple, inexpensive, easy-to-install ornamental bodies for use with the bicycle wheel which are constructed in such a manner that they are securely held in place by the spokes of a wheel when they are installed on such a wheel.

In accordance with this invention these objectives are obtained by providing an ornamental body intended for the utilization indicated which comprises a generally flat body of a self-supporting material having a peripheral edge and opposed sides, these sides being sufficiently close to one another so that the body is capable of being inserted between bicycle wheel spokes where the spokes cross one another, and a plurality of cam means for applying forces to the spokes and for at least partially releasing such forces when the body is inserted between two spokes where such spokes cross one another and is twisted, each of the sides of the body being provided with at least two of these cam means located so that each spoke is simultaneously engaged at two different points.

BRIEF DESCRIPTION OF THE DRAWING

Inherently, a summary such as the preceding is limited in the amount of intelligence that it can convey. Further details relative to the present invention will be apparent from a detailed consideration of the remainder of this specification, the appended claims forming a part of this specification, and the accompanying drawings in which:

Figure 1:
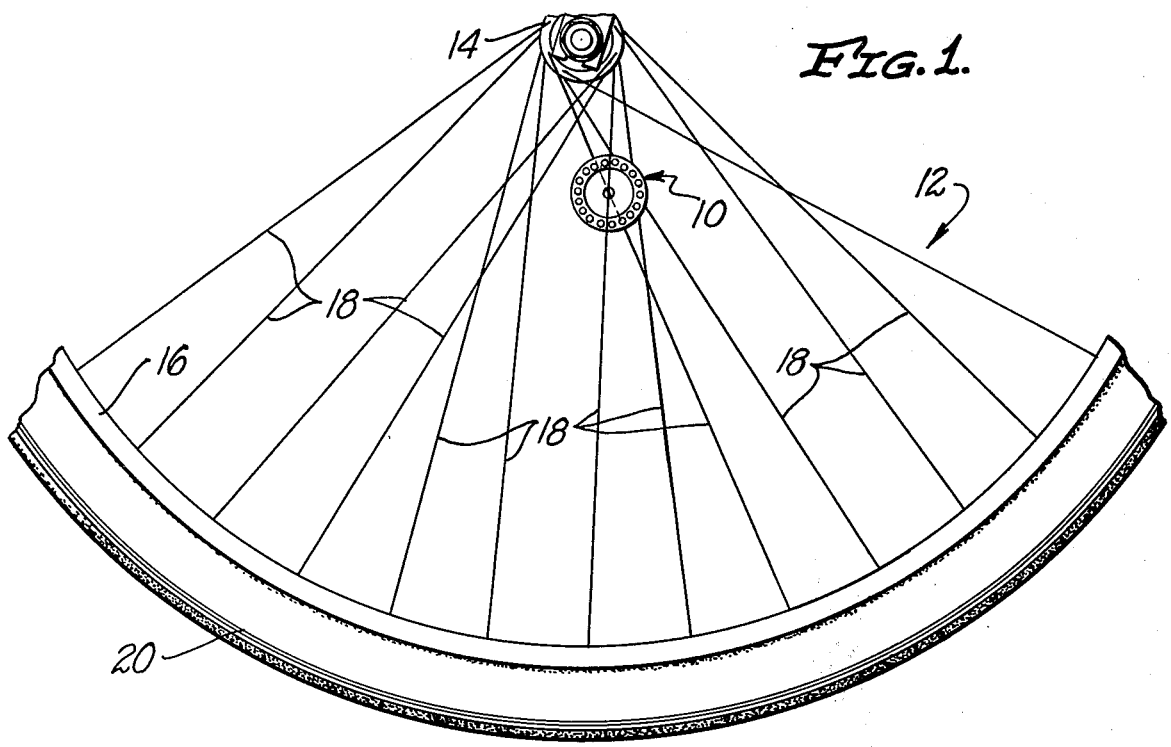
FIG. 1 is a partial side elevational view of a bicycle wheel showing a presently preferred embodiment of an ornamental disc of this invention installed on such a wheel.
Figure 2:
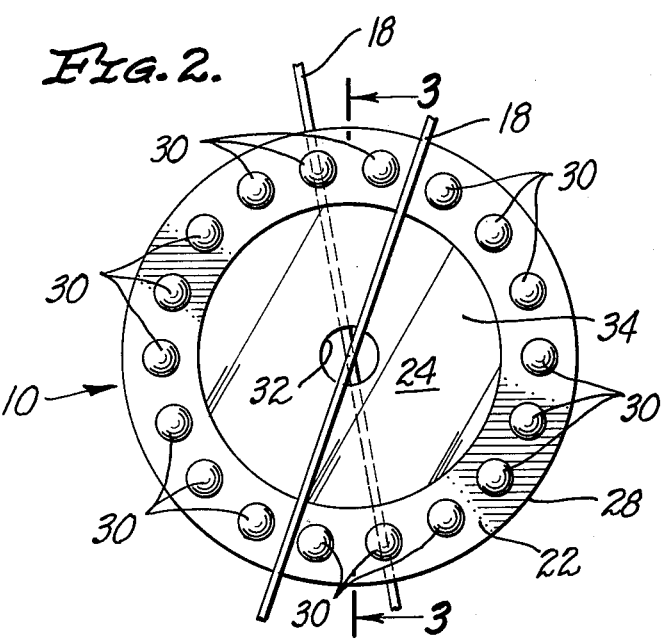
FIG. 2 is an enlarged side elevational view showing the disc and two spokes associated with it as illustrated in FIG. 1.
Figure 3:
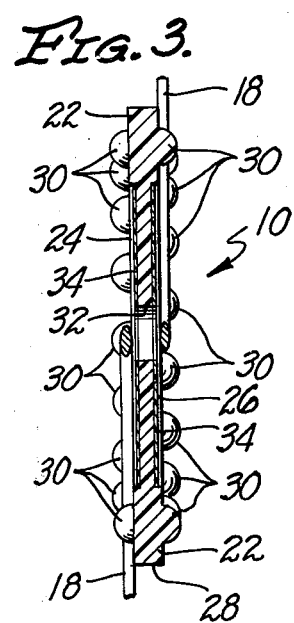
FIG. 3 is a cross-sectional view taken at line 3—3 of FIG. 2.

It will be recognized that the two discs illustrated in the drawings are only specific structures embodying the concepts of the invention set forth and defined in the appended claims. These concepts can be utilized in a variety of somewhat differently appearing and/or somewhat differently constructed structures through the use of ordinary engineering skill or ability.

DETAILED DESCRIPTION

In the initial three figures of the drawing there is shown an ornamental disc 10 of the invention in use upon a conventional bicycle wheel 12 having a hub 14 connected to a rim 16 by spokes 18. This rim 16 carries a conventional bicycle tire 20. The spokes 18 and the wheel 12 are normally arranged so the different spokes 18 are positioned at an angle to one another so as to appear to cross one another when the wheel 12 is viewed from the side. Such spokes 18 are also normally spaced from one another in a comparatively short distance where they cross one another. Such spokes 18 are also somewhat resilient in character so as to be capable of being temporarily distended or bent a comparatively small amount without the wheel 12 being damaged.

The disc 10 has a peripheral rim 22 on each of its sides 24 and 26 adjacent to its peripheral edge 28. A plurality of protuberances 30 are provided on each of the rims 22. These protuberances 30 are of a rounded, dome-like shape and are spaced from one another. The protuberances 30 on the sides 24 and 26 are offset from one another an amount approximating the normal angle between two bicycle spokes 18 which cross one another. These sides 24 and 26 are spaced from one another a distance approximating the distance between two spokes 18 which cross one another.

This construction enables the disc 10 to be inserted between two spokes 18 where such spokes 18 cross. After the disc 10 is so inserted it is then twisted or rotated. As this occurs, the protuberances 30 engage the two spokes 18 and will apply forces to these spokes 18 to temporarily distend them to a sufficient extent that these spokes 18 will pass over the protuberances 30 engaged. As this happens, the applied forces exerted against the spokes 18 by the protuberances 30 will be at least partially released. The two spokes 18 involved will then be held or locked in place between the protuberances 30 in such a manner that they will remain in position as the wheel 12 is rotated in a conventional manner.

In order to aid such insertion and positioning of the disc 10, it is considered preferable to locate a small hole 32 in the center of this disc 10 so that the hole 32 leads between the sides 24 and 26. When this hole 32 is used it is simple to determine visually when the disc 10 is in a proper position to be twisted as it is being mounted upon a wheel. This is because the cross over-point of the two spokes 18 can be viewed through the hole 32. The hole 32 obviously can be used in attaching the disc 10 to virtually any type of support (not shown) if the disc 10 is employed on other than a bicycle wheel.

For economic reasons, it is preferred to form the entire disc 10 including the rims 22 and the protuberances 30 as a unitary body out of a self-supporting rigid polymer material or corporation such as styrene. Preferably the disc 10 is formed of a fluorescent composition consisting of a fluorescent dye incorporated within such a polymer in order to increase the decorative effects achieved. One or both of the sides 24 and 26 can easily be used to relay an advertising message since these sides 24 and 26 are flat. If desired, in order to improve bicycle safety, layers 34 of a known phosphor material may be secured to the sides 24 and 26 in a conventional manner through the use of an adhesive (not shown).

Figure 4:
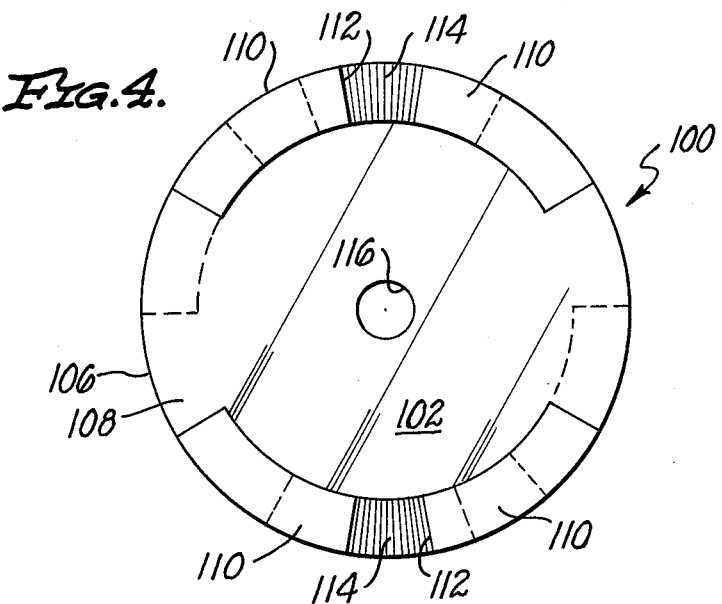
FIG. 4 is a side elevational view of a modified ornamental disc in accordance with this invention.
Figure 5:
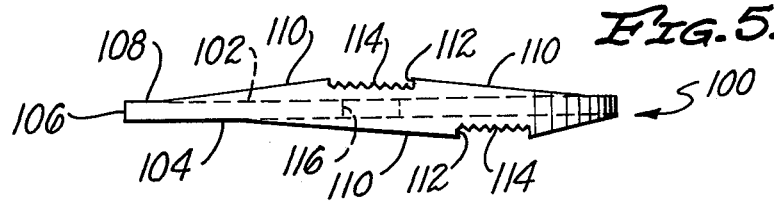
FIG. 5 is an edge view of the disc shown in FIG. 4.

In FIGS. 4 and 5 of the drawings there is shown a modified disc 100 in accordance with the present invention which is preferably constructed as a unitary body of a material such as described in the preceding. This disc 100 has flat sides 102 and 104 connected by a peripheral edge 106. A peripheral rim 108 is located on both of the sides 102 and 104 for the purpose of holding sloping walls 110 which lead outwardly from the sides 102 and 104 and which are separated by notches 112 having serrated bottoms 114. These walls 110 serve a similar function to the function served by the protuberances 30 when the disc 100 is employed. During the use of this disc 100 the spokes of a wheel will fit across a centrally located hole 116 corresponding to the hole 32 and will lie within the notches 112.

The protuberances 30 on the rim 22 on the disc 10 and the sloping walls 110 on the rims 108 on the disc 100 can be considered or termed "cams" or "cam means" because of the manner in which these discs 10 and 100 apply pressure to temporarily deform bicycle wheel spokes as they are installed. It is considered, however, that it is also possible to consider the entire rim structures 22 and 108 as cams or cam means since the actions achieved involve not only the distending action of the protuberances 30 and walls 110 but also involve the release of pressure which occurs when the discs 10 and 100 respectively, are rotated so as to either be between two of the protuberances 30 or within the notches 112.

Figure 6:
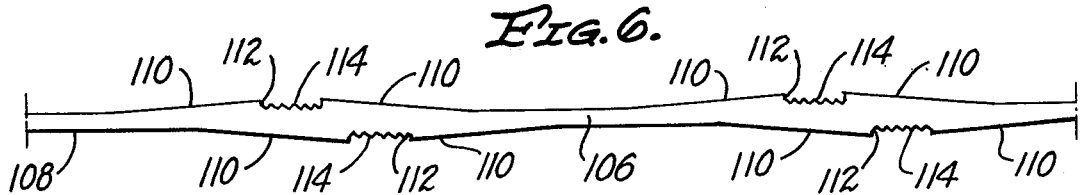
FIG. 6 is a linear projection showing the edge configuration of the disc showed in FIGS. 4 and 5.

In order to achieve this action, the disc 100 is formed so as to have an edge configuration as shown in FIG. 6 so as to provide for a gradual distention of wheel spokes as this disc 100 is inserted into an operative position. This structure of the disc 100 is considered preferable to the structure of the disc 10 when a disc as described is to be used with wheels having fairly strong spokes which are difficult to bend. The protuberances 30 on the disc 10 are, however, normally adequate for use with conventional bicycle spokes.

With both of these structures there are effectively two cams or cam means located on each of the sides of each of the structures which are operative when the discs 10 and 100 are used. These cams or cam means engage and hold spokes which extend across the centers of the discs 10 and 100. The spacing between the protuberances 30 and the widths of the notches 112 is preferably great enough so as to accomodate variations in the angles at which individual spokes cross over one another in different bicycles. The disc 10 is, in some respects, simpler to install than the disc 100 because it utilizes a plurality of the protuberances 30, sets of which can serve as cams or cam means. Those protuberances 30 which are not operative to retain a spoke when the disc 10 is installed are considered to serve a decorative function.

We claim:

1. An ornamental body which is primarily intended to be located on a bicycle wheel between two spokes of such a wheel which cross one another at an angle and which are spaced from one another where they cross, said body comprising:
    a generally flat body of a self-supporting material having a peripheral edge and opposed sides, said sides being sufficiently close to one another so that said body is capable of being inserted between said spokes where said spokes cross one another,
    a plurality of cam means for applying forces to distend said spokes away from one another when said body is inserted between said spokes where said spokes cross one another and when said body is thereafter twisted a first amount, for at least partially releasing the forces causing distention of said spokes upon said body being twisted a further amount and for holding said body in position relative to said spokes through engagement between said spokes and said body upon such release,
    each of said sides of said body being provided with at least two of said cam means, all of said cam means being integral with the sides upon which they are located, said cam means on each of said sides being located so that each spoke is simultaneously engaged at two different points.

2. An ornamental disc as claimed in claim 1 wherein: said body and said cam means are integral with one another and are formed of a fluorescent material.

3. An ornamental disc as claimed in claim 1 including:
    a centrally located opening extending through said body between said sides, said opening being positioned relative to said cam means so that said body may be located through visual inspection so that the central region of said body is adjacent to where said spokes cross one another.

4. An ornamental disc as claimed in claim 1 wherein: said body is a disc and wherein said sides have peripheries adjacent to said edge, said cam means being located on said peripheries of said sides so as to extend outwardly from said sides.

5. An ornamental disc as claimed in claim 4 wherein: said cam means comprise a plurality of equally spaced protuberances extending around the periphery of each of said sides, said protuberances being shaped so as to be capable of engaging and distending said spokes during the insertion and twisting of said body between said spokes.

6. An ornamental disc as claimed in claim 5 wherein: said body and said cam means are integral with one another and are formed of a fluorescent material, and including
a centrally located opening extending through said body between said sides, said opening being positioned relative to said cam means so that said body may be located through visual inspection so that the central region of said body is adjacent to where said spokes cross one another.

7. An ornamental disc as claimed in claim 4 wherein: each of said cam means comprises two sloping walls leading outwardly from surface of one of said sides, said walls being separated by a notch where said walls are remote from said surface of said side.

8. An ornamental disc as claimed in claim 7 wherein: said body and said cam means are integral with one another and are formed of a fluorescent material, and including
a centrally located opening extending through said body between said sides, said opening being positioned relative to said cam means so that said body may be located through visual inspection so that the central region of said body is adjacent to where said spokes cross one another.

* * * * *